United States Patent [19]

Wolford

[11] Patent Number: 4,670,957

[45] Date of Patent: Jun. 9, 1987

[54] TOOL FOR CRIMPING A CORNER BEAD PIECE OVER AN EXTERIOR PLASTERBOARD CORNER

[76] Inventor: Richard P. Wolford, 21 Kristin Pl., Apt. 1014, Schaumburg, Ill. 60195

[21] Appl. No.: 809,294

[22] Filed: Dec. 16, 1985

[51] Int. Cl.[4] .............................................. B23P 11/00

[52] U.S. Cl. ...................................... 29/243.5; 29/275

[58] Field of Search ............. 29/243.5, 243.56, 243.57, 29/243.58, 254, 275, 278; 72/325, 450

[56] References Cited

U.S. PATENT DOCUMENTS

| | | | |
|---|---|---|---|
| 969,471 | 9/1910 | Grossman | 29/243.57 |
| 2,178,187 | 10/1939 | Sake | 72/325 |
| 2,358,142 | 9/1944 | Carlin | 29/243.57 |
| 2,859,445 | 11/1958 | Larrabee | 72/32.5 |
| 3,160,890 | 12/1964 | Lefebvre | 29/243.56 |
| 4,021,516 | 5/1977 | Stevenson | 269/41 |
| 4,593,443 | 6/1986 | Wolford | 29/243.5 |

*Primary Examiner*—Robert C. Watson
*Attorney, Agent, or Firm*—Charles F. Lind

[57] ABSTRACT

The disclosed crimping tool has two faces substantially normal to one another across an interior corner, which fit then against and over a corner bead piece, which in turn is positioned against and over an exterior structural corner of meeting plasterboard sheets. A post extends rearwardly away from the faces, and a striker is mounted to move on the post. A crimping pin is carried relative to each face, connected at their remote ends to the striker, and connected relative to the frame by means of a shaft fitting through an angled slot in each crimping pin. As arranged, each crimping pin is operable to move from one axial position with a die end recessed behind the faces to another axial position with the die end projected forwardly beyond the faces. The crimping pins are angled relative to one another and relative to each respective tool face. Movement of each crimping pin from the recessed position to the projected position, causes the die end initially to just pass over the edge of the underlying corner bead piece and then to move laterally against the edge of the underlying corner bead piece. The striker is hit with a mallet to drive the crimping pins with enough force to crimp the corner bead piece to the structural corner.

17 Claims, 5 Drawing Figures

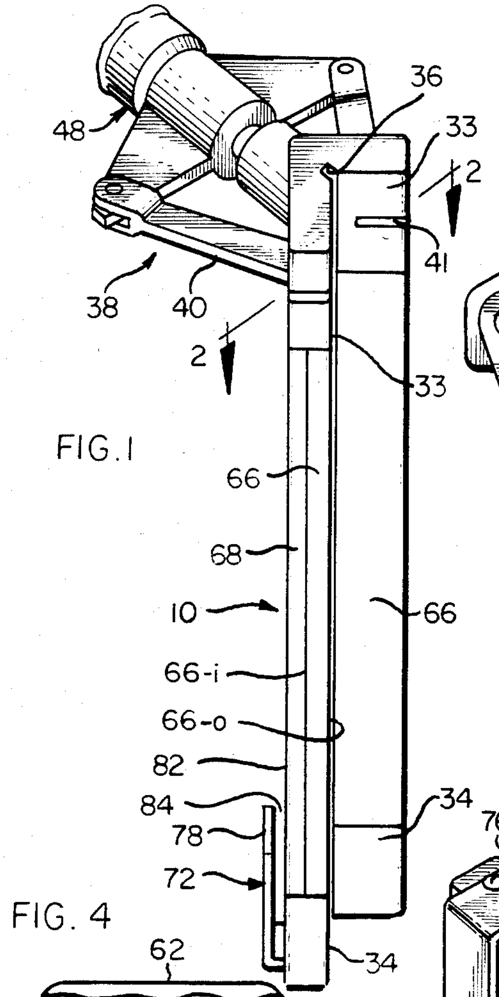
FIG. 1
FIG. 2
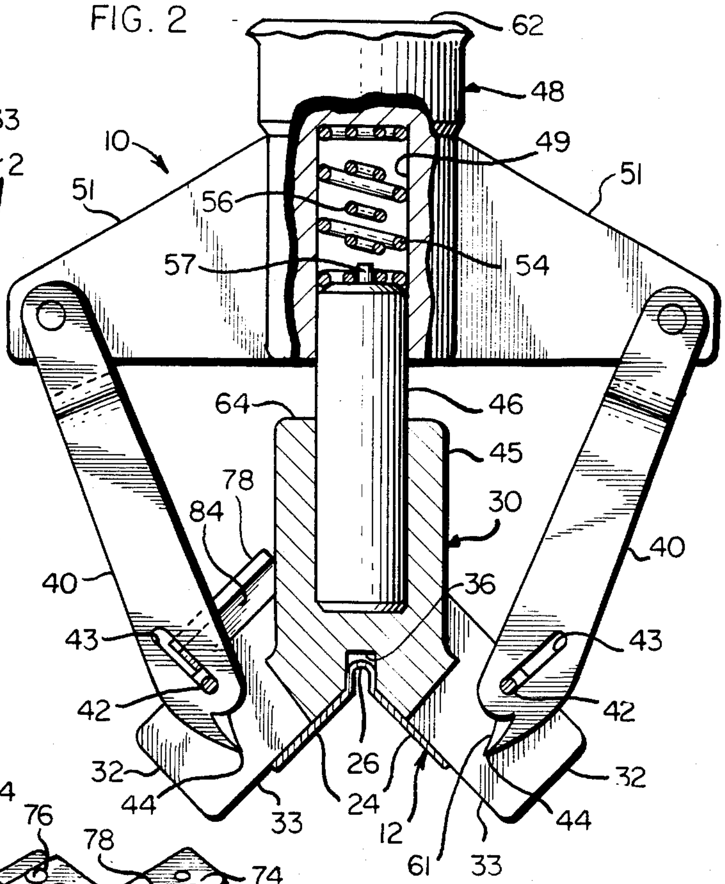
FIG. 4
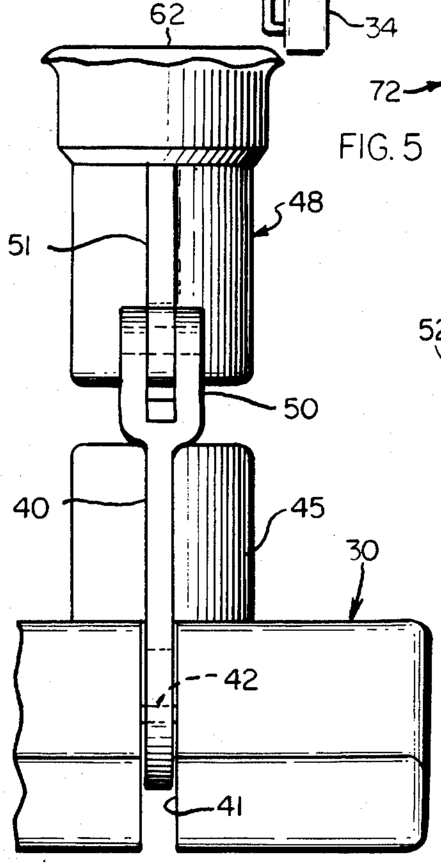
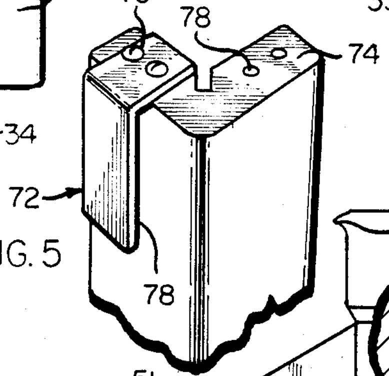
FIG. 5
FIG. 3
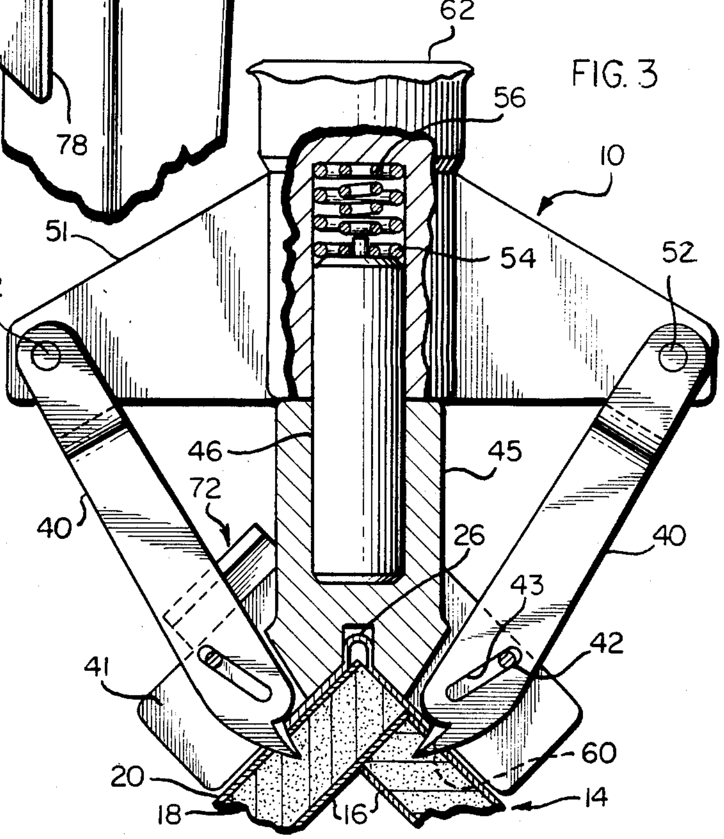

TOOL FOR CRIMPING A CORNER BEAD PIECE OVER AN EXTERIOR PLASTERBOARD CORNER

FIELD OF THE INVENTION

This invention relates to a crimping tool adapted to be positioned over a corner bead piece, itself covering the exposed edges of two sheets of plasterboard meeting at an exterior corner, and adapted to then be actuated to shift crimping pins against the corner bead piece and into the plasterboard, operable to crimp part of the corner bead piece to secure it over the exposed plasterboard corner.

BACKGROUND OF THE INVENTION

One form of construction of interior walls, partitions, soffits or the like, involves the use of structural framing covered on at least one side by sheets of plasterboard, or dry wall material, butted edge-to-edge. The plasterboard is generally manufactured in standard size sheets, such as four feet by eight feet, or four feet by ten feet, and may be $\frac{1}{2}$, $\frac{5}{8}$, or $\frac{3}{4}$ of an inch in thickness. The plasterboard sheets are cut in-the-field to size; and tape means and a plaster-composition may then be used over the butted joints of the plasterboard sheets, and sanded down to define a smooth finished surface.

For walls, partitions or soffits having two flat sheets of plasterboard meeting one another at an exterior corner, a metal "corner bead" piece is used to cover the exposed edges of the plasterboard sheets, or structural corner as such will hereinafter be termed in this disclosure, to define a solid and true corner edge. The corner bead piece is somewhat L-shaped, having a pair of generally flat legs connected to one another across a slightly rounded exterior corner or bead. The legs are angled relative to one another at just slightly less than 90 degrees, to allow that the piece can be set tightly in place over the exterior structural corner, and have the exposed corner bead set straight and true. Nails may then be driven through holes in the legs of the corner bead piece, through the underlying plasterboard, and into the underlying framing, to secure the corner bead piece in place at, and over, the exterior structural corner.

The tape means and plaster-composition may then also be used over the corner bead piece up the the corner itself, again being sanded down to define smooth finished corner surfaces.

For rapid high-output installation of the corner bead pieces, a crimping tool may be used, instead of nails. One form of crimping tool has an elongated frame comprising two faces angled at right angles across an interior corner that is adapted to be positioned over the corner bead piece, when the latter is itself in place over the exposed edges of the plasterboard sheets. Crimping pins are pivoted to the frame, one relative to each face. Each pin has a die end that, in one rotated position, is recessed behind the face; but in another rotated position, the die end is projected forwardly of the tool face. This basis construction is illustrated in U.S. Pat. No. 2,859,445; where handles connected to the crimping pins are manually shifted to move the die ends against and through the underlying corner bead piece and into the plasterboard, so as to secure the corner bead piece over the exterior structural corner.

Each crimping pin, being pivoted to the tool frame, is rotated almost a quarter turn in one direction as it is being shifted between the recessed and projected positions. The projected die end of each crimping pin moves along a curved path, initially in the direction transverse to the adjacent plasterboard wall, and over the edge of the corner bead piece; and then forwardly toward the structural corner, as it is moving against and deforming the corner bead piece into the plasterboard.

A modified version of that tool provied a striker mounted on a post secured to the frame, the striker being adapted to move toward or away from the back side of the tool faces; and the striker is connected by links to the crimping pins. The striker is adapted to be hit with a mallet to rotate the crimping pins from the recessed positions to the projected positions, rapidly and with a large force, to again move the die ends against and through the underlying corner bead piece.

The link connected between each crimping pin and striker, and the crimping pin itself, cooperate together almost as a toggle linkage. Specifically, when the crimping pin die end is in the recessed position, the crimping pin and link are almost, but not quite, aligned along a straight line; while when the die end is in the projected position, the crimping pin and link are angled sharply, approximately at a right angle, relative to one another. This sharp angular orientation of the crimping pin and link, with this near maximum moment arm, generates a large force on each crimping pin in the latter stages of crimping, as the die end approaches the final projected position.

On the other hand, the near straight line alignment of the crimping pin and link provides a minimum moment arm for the transmission of forces, in converting the impact of the mallet against the striker and the resultant initial movement of the striker toward the structural corner, into effective movement of the die ends toward and into the structural corner. In fact, in order to move each crimping pin from the recessed position toward the projected position, the crimping pin and link each must be rotated, but in opposite directions, and the shaft connection between the two components must be moved laterally of or transverse to the movement of the striker. This linkage effectively transmits only a small portion of the mallet force applied against the striker into rotating the crimping pins, particularly as the linkage is first being moved off of the nearly straight line linkage alignment, but instead is absorbed wastefully by the linkage itself. At times even, the reaction "kicks" the tool frame itself off of the structural corner, and as this can be very large, the operator must exert a considerable manual pushing force against the tool so as to maintain it firmly against the structural corner.

Accordingly, one disadvantage of the impact crimping tool discussed is the high failure rate experienced in the linkage, between the striker and the crimping pins; most commonly, the pivot shaft, between the crimping pin and connecting link, fails. This failure may be caused by the combination of: (1) the quarter-turn rotation of the adjacent components each time the tool is operated, and/or (2) the ineffective transmission of the mallet force striking against the striker. Another disadvantage of the impact crimping tool discussed is the reaction "kick" of the tool frame off of the structural corner; requiring the operator to exert considerable manual pushing force against the tool in order to maintain it against the structural corner.

Still another disadvantage of the impact crimping tool discussed is the inconvenience of having to repeatedly set tne tool, or the mallet, down after use, and then to pick the tool, or the mallet, up when one wants to use it again. This may typically come about when the corner bead piece must be initally located over the structural corner; as it is difficult to simultaneously hold the tool, the mallet, and the corner bead piece, with only two hands; while accurately setting the corner bead piece in place. In this instance, generally the tradesman sets the mallet down, or pinches it between his legs, while using one hand for the tool and the other hand for the corner bead piece. This may be a rather poor solution, for example, if and when the tradesman is standing on a ladder or scaffold, with the typical threat of sway and/or height. During periods of nonuse of the tool, as when the tradesman must measure or cut the corner bead piece to length, or the like, in the attempt to keep the tool on his person, some tradesmen have wired the tool to his tool belt. However, such may not provide stability or comfort of support when the tool is secured onto the tool belt during nonuse; or fast and convenient securement of the tool onto, or removal of the tool from, the tool belt; or durability after repeated use.

SUMMARY OF THE INVENTION

A basic object of the present invention is to provide an improved impact tool for crimping a corner bead piece over an exposed exterior structural plasterboard corner, the tool being easy to use, and durable in use, in that it directs a large percentage of the impact force from the mallet effectively into actual crimping of the corner bead.

A more specific object of this invention is to provide an improved impact crimping tool having operating linkage that easily shifts each crimping pin from its recessed position to its projected position, effectively utilizating and transmitting the mallet forces, so as to complete the crimp and secure the corner bead piece to the structural corner.

Another basic object of this invention is to provide an improved impact crimping tool that can be used without repeatedly setting the tool, or mallet, down, during normal use and/or nonuse of the tool.

Another specific object of this invention is to provide an improved impact crimping tool having means that will allow the corner bead piece to be held to the tool, as positioned on the tool, to allow for one hand manipulation of the tool and corner bead piece together, to initally locate and set the piece relative to the structural corner; and having means to provide easy and reliable tool securement to and removal from one's tool belt, with stability and comfort of support as secured onto the tool belt, and durability even after repeated use.

To achieve these and other objects, the present invention may provide a crimping tool having cooperating faces against which the separate corner bead piece is to be positioned, and crimping pins that are guided by cooperating slot and shaft means between the tool and the crimping pins, operable to easily and effectively guide the pins with a complex axial and rotational motion through the corner bead piece, to crimp the same onto the structural corner.

The crimping pins may be angled between 60 and 90 relative to the tool face, and the slot in each crimping pin may be angled between 10 and 30 degrees relative to the length of the crimping pin, operable then to increase the angle between the crimping pins as the pins are driven increasingly against the corner bead piece.

Magnet means may be located on the tool faces to engage and magnetically hold the corner bead piece to the tool, when positioned in place against the tool, to allow one hand manipulation of the combined tool and corner bead piece.

Clip means may be secured to the tool end remote from the crimping pins, overlying the tool frame, to provide easy and reliable securement onto and removal from the user's tool belt, with stability and comfort of support as secured onto the tool belt, and durability after repeated use.

BRIEF DISCRIPTION OF THE DRAWINGS

Further objects, advantages and features of the present invention will appear and become apparent from the following disclosure and description, including as a part thereof the accompanying drawings, in which:

FIG. 1 is a perspective view of the crimping tool to be disclosed herein;

FIG. 2 is a fragmentary sectional view, taken generally along line 2—2 in FIG. 1 (although being to a slightly enlarged scale compared to that used in FIG. 1), showing the retracted position of the tool and corner bead piece positioned in place on the tool;

FIG. 3 is a fragmentary sectional view, similar to FIG. 2, except showing the tool in the crimping position of the underlying corner bead piece to an exterior structural corner;

FIG. 4 is an elevational view of the tool illustrated in the previous FIGS. 1–3 and FIG. 5 is a perspective view of the crimping tool, as seen from the opposite end of FIG. 1, illustrating clip means for securing the tool to a work belt or the like.

DESCRIPTION OF A PREFERRED EMBODIMENT OF THE INVENTION

FIG. 1 illustrates a crimping tool 10, FIGS. 2 and 3 show a corner bead piece 12 in place relative to the tool 10, and FIG. 3 shows the tool in place over the corner bead piece as the piece is being crimped over and relative to an exterior structural corner 14. The structural corner 14 typically would be formed by two flat plasterboard sheets 16 meeting at 90 degrees, or right angles, relative to one another. The illustrated conventional plasterboard sheet 16 has an inner core 18 of hardened gypsum plaster sandwiched between laminates 20 of fiberboard, paper, felt or the like bonded or otherwise secured thereto.

The corner bead piece 12 (illustrated in both FIGS. 2 and 3) may be of an L-shaped cross-section, formed by a pair of legs 24 connected together across an intermediate rounded corner bead 26. The legs 24 typically would be angled at just less than 90 degrees from one another to allow them to be flexed over the exterior structural corner 14, which as noted is generally a right angle corner. As flexed in place, the legs 24 may lie somewhat flush against the outer laminates 20, and the bead 26 may be near, but outwardly spaced from, the intersection of these surfaces.

The crimping tool 10 is also somewhat L-shaped, having an elongated unitary frame 30 with two angled arms 32, each having generally flat pads 33 and 34 disposed at the opposite ends of the arms, the adjacent pads 33 and 34 being angled at approximately 90 degrees from one another across a defined interior corner. A cutout or recess 36 is defined the length of the frame near where the pads 33 or 34 would intersect, to provide clearance space to receive the bead 26 of the corner bead piece 12, when the corner bead piece is in place on the tool (see FIGS. 2 and 3) with tne legs 24 against the pads. The crimping tool 10 may be between 10 and 15 inches in length.

Crimping means 38 are provided on the tool 10, located proximate the pad 33 end of the tool. The disclosed crimping means 38 include a pair of crimping pins 40, each passing through an opening 41 in each arm 32 and guided on a shaft 42 relative to the arm. In this regard, each crimping pin has a slot 43 through which the guide shaft 42 passes, the slot 43 being angled to extend transversely to the length of the crimping pin. A post 46 extends from a boss 45 formed in the frame, in a direction rearwardly away from the tool pads 33, from in line approximately through their intersection and angled midway therebetween, or 45 degrees from each. A striker 48, having a bore 49 fitted over the post 46, is adapted to ride back and forth on the post 46. The striker 48 and crimping pins 40 are pivotably connected together, as by pin yokes 50 (FIG. 4) fitting over the lateral webs 51 of the striker, and shafts 52 fitting through aligned holes therein.

As illustrated in FIGS. 2 and 3, the pivotal connections at shafts 52 between the striker 48 and the crimpimg pins 40 are laterally spaced outwardly beyond the guide shafts 42. When oriented in a preferred embodiment, each crimping pin is angled relative to its respective tool pad, and this angle may be between almost normal (or 90 degrees) and perhaps 60 degrees relative thereto. As such, the crimping pins diverge from one another, in the direction away from the rear side of the pads 33, and may be angled between 90 and 30 degrees from one another. Also, each crimping pin slot 43 may be angled relative to the length of the crimping pin, between perhaps 10 and 30 degrees; to provide in a preferred embodiment that the slot extends almost normal to the pad 33, when the crimping pin is in the retracted or recessed position of FIG. 2.

Any reciprocating movement of the striker 48 is thus transmitted to the remote ends of the pins 40, to impart an axial movement to the crimping pins; while the angled crimping pins and the slot 42 and shaft 43 cooperation, upon axial movement of the crimping pins past the shaft 43, imparts some rotation to the crimping pins, tending to increase the included angle between the crimping pins.

Specifically, the free adjacent end 44, or die end, of each crimping pin is sized so that, in one relative axial position of the pin (see FIG. 2), it lies recessed beneath the tool pad 33; while in another relative axial position of the pin (see FIG. 3), it projects outwardly beyond the tool pad, and also is moved laterally, in the direction of the corner recess 36.

Spring means 54 and 56, located in the bore 49 between the post 46 and the striker 48, operate to bias the striker ,and the crimping pins connected thereto, normally to the recessed position illustrated in FIG. 2. Spring 54 remains against the post and striker at all times, exerting a continuous bias tending to hold the striker and connected crimping pins in the recessed position; while spring 56 may be constrained on small boss 57 on the post 46, and be sized in length to butt against the striker only when the crimping pins are near and at the fully projected position beyond the pads, as illustrated in FIG. 3. The spring rate of the spring 56 may be same as or higher than the spring rate of spring 54, to provide the largest force tending to return the connected crimping pins from the projected position (FIG. 3) to the recessed position (FIG. 2). As will be noted later, this is done to overcome possible binding forces that may exist between the crimping pins 40 and the structural corner 14 and/or corner bead piece 12 after the crimping has been finished.

Each corner bead piece 12 may be of a standard size, with each leg 24 extending perhaps 1¼ and 1¼ inches away from the bead 26, on the outside and inside, respectively, of the corner bead piece. Each tool pad 33 and 34 may extend, in the direction away from the relieved corner 36, a distance of the order of 1¼ inches from the corner, so as to overlie and completely cover the corresponding leg 24 of the corner bead piece. The die ends 44 of the crimping pins 40 are located to move forwardly of the tool pads 33 just beyond or spaced from the outer end edges of the legs 24.

As noted, movement of the striker 48 inwardly along the post 46 causes the crimping pins 40 to shift axially and rotatably from the position of FIG. 3, with the die ends 44 recessed beneath the plane of the tool pads 33, to the crimping position of FIG. 4, with the die ends 44 projected outwardly beyond the tool pads 33. This causes the die ends 44 to move both into the underlying wall structure and against the corner bead 12, crossing over the end edges of the leg 24 to deform or crimp part of the legs, as tab-like configurations 60 (see FIG. 4), into the underlying corner structure; mechanically holding the corner bead piece 12 tightly to the underlying corner structure 14. Each die end 44 has a V-shaped edge 61 extended generally axially of the crimping pin, although it may be angled slightly in a direction but opposite to the slot 43, which plows through the leg as the crimping pin in driven in.

The striker face 62 may be hit with a large rubber mallet or the like (not shown) to deliever a relatively rapid and large force driving the crimping pins into the corner structure. The striker 48 may bottom against face 64 of the boss 45, at the fully projected positions of the crimping pins (FIG. 3), to transmit all excess forces via the tool frame to the corner structure 14.

The crimping tool 10 may also have magnets 66 (see FIG. 1) on the tool arms 32, received in recesses defined between the pads 33 and 34. The magnets 66 may be of a ferromagnetic material, such as barium ferrite crystals, blended into a rubber or vinyl binder, and shaped as flat flexible pieces. The magnet pieces 66 may be secured by bonding (or screws, not shown) relative to wall 68 of each tool arm. Each magnet 66 may have the opposite magnetic North and South polarity on the opposite flat faces 66-i and 66-o. The exterior faces 66-o of the magnets 66 may be coplanar with tne respective frame pads 33 and 34 of the crimping tool 10, and tnus together define angled tool faces against which the legs 24 of the corner bead piece may seat.

The corner bead piece 12, being of a magnetic steel material, will be magnetically attracted to and will adhere to the magnets 66 when positioned against the tool pads. As only one of the angled corner bead piece legs 24 may contact, and thus be held by only one of the tool magnets, the magnet 66 in each tool face should have sufficient holding power for the full weight of the corner bead piece. Each magnet may extend across the full width and almost across the full length of the tool face, resulting in a large effective surface area to contact the corner bead piece positioned thereagainst; even moderate magnetic flux density thereby providing sufficient holding force.

The tool frame may typically be formed of a non-magnetic material, such as an alloy of zinc or aluminum, and may be die-cast. The crimping means 38 may be formed of steel or other durable material; the crimping pins 40 and shafts 42 and/or 52 may even be of hardened or tool steel. It may also be desirable to provide a thin backing plate (not shown) of steel or other magnetic material against the inner face 66-i of the magnet, for effectively increasing the magnetic forces at the outer face 66-o of the magnet, and thus its holding power.

The crimping tool 10 also has a clip 72 secured to end face 74 of the tool frame, at the end thereof opposite from the crimping means 38. The clip 72 is L-shaped, having one end leg flush against the end face 74, with bolts 76 threaded into taps (like at 78) to hold the clip to the frame; while the opposite end leg 80 parallels in spaced adjacent relation the rear surface 82 of the tool arm 32, defining a clearance 84 therebetween sufficiently large to snuggly receive a tool belt (not shown) worn by the user of the tool. The clip 72 may thus be hooked over the user's tool belt to suspend the tool 10 from the belt, generely near either the right or left hip area. As illustrated, the threaded taps 78 in the opposite arm allows the clip 72 to be secured to either arm, for added versatility of carriage on the right or left side of the user, with the crimping means 38 then being angled off to either the front or rear side of the adjacent leg, depending on the personal preference of the user, for comfort and convenience. Thus, the crimping tool may be easily carried around by the user, while leaving both hands free for other purposes. The clip may be made from spring steel, or equilivent material.

SUMMARY OF THE OPERATION

The disclosed crimping tool 10 may be operated, with one hand holding the tool 10 and with the other hand holding both the corner bead piece 12 and the mallet (not shown), to place the corner bead piece in magnetic association with the tool faces. The combined tool and corner bead piece, now carried on the tool, may then be manipulated with the one hand to line up the corner bead piece 12 properly over the corner structure 14, edge-to-edge with any adjacent secured corner piece or butted against the adjacent transverse wall (neither being shown). This can be done easily, quickly and safely, allowing the person to even reach out to an overhead corner, more comfortably and confidently, and even while working off a ladder or scaffold. As the mallet (not shown) may be held in the other hand during this initial positioning of the corner bead piece, one is immediately ready then to first tap it against the tool frame to firm the corner bead piece 12 against the underlying exterior structural corner 14, and then to smack it hard against the striker face 62 to produce the crimps 60 in the corner bead piece.

The crimping pins 40, when the striker is hit, are driven into the structural corner 14, and past and through the corner bead piece 12, to made the crimps 60 most effectively. The initial and final orientations of the crimping pins, being somewhat aligned with the direction of the mallet blow, effectively transfers a great percentage of the blow immediately to the crimping pins, to do the work of crimping. This reduces the kick the tool may have off of the structural corner; and the magnets 66 and pads 33, 34 provide solid support between the tool frame and the corner structure 14, giving a very solid feel to the mallet "hit".

After the first crimp, the tool can then be relaxed off of the corner bead piece, while yet holding the corner bead piece with the mallet hand, and moved axially along the corner bead piece some 6–10 inches or the like, to set up again and make other crimps. After several crimps have been made, the corner bead piece will be sufficently held in place that one need not further hold the corner bead piece when shifting the tool between making additional crimps.

The tool 10 also can be easily carried around on one's person, by clipping it onto one's tool belt, yet having both hands free for other things.

What I claim is:

1. A tool for crimping a corner bead piece to an underlying exterior structural corner, comprising the combination of a frame having arms defining two pads angled substantially normal to one another across an interior corner, adapted to be positioned against and over the corner bead piece, two separate elongated crimping pins and means including an opening in each pad to receive one of the crimping pins extended transverse to the respective pad, a striker, means to support the striker to recriprocate along a path angled relative to the pads, and means pivotally connecting the remote ends of the crimping pins to the striker, means at the respective pad openings cooperating with an intermediate portion of each crimping pin, operable to guide each crimping pin for complex axial and rotational movements relative to its pad, said pivotal connecting means being spaced apart a distance greater than the distance between the intermediate guide means of the crimping pins, to provide thereby that the crimping pins diverge from one another in the direction away from the pads and are angled relative to the respective pads and to the path of movement of the striker, each crimping pin having its adjacent end recessed within its pad, in one axial position, and projected outwardly beyond its pad in other axial positions, to pass with clearance initially just outwardly beyond the edge of the underlying corner bead piece and thereafter to interfer increasingly against the corner bead piece, in moving from the one recessed axial position to the other projected axial positions, said striker being adapted to be hit with a mallet or the like to drive the crimping pins against and into the underlying corner bead piece and into the corner structure, to crimp and secure the corner bead piece to the corner structure.

2. A crimping tool for a corner bead piece, according to claim 1, wherein said guide means includes said crimping pin having an elongated intermediate slot, and means including separate shafts crossing the respective pad openings and fitting through the respective crimping pin slots, operable to guide each crimping pin relative to its pad.

3. A crimping tool for a corner bead piece, according to claim 2, wherein said intermediate slot in each crimping pin is angled, between 10 and 30 degrees, relative to the length of the crimping pin.

4. A crimping tool for a corner bead piece, according to claim 3, further wherein the crimping pins are angled in the one axial position at between 60 and 90 relative to the tool pad.

5. A crimping tool for a corner bead piece, according to claim 1, further including a pair of springs disposed to engage the striker operable to bias the crimping pins in the direction toward the recessed axial position, one of the springs being effective at all of the relative axial positions and the other spring being effective only at and nearly at the fully projected axial position of the crimping pin relative to the tool pad.

6. A crimping tool for a corner bead piece, according to claim 5, further wherein the one spring has a moderate spring rate to develop a moderate but continuous biasing force, and the other spring has a higher spring rate than the one spring to develop a large biasing force but only to move the crimping pins from the fully projected axial position.

7. A crimping tool for a corner bead piece, according to claim 6, wherein said guide means includes said crimping pin having an elongated intermediate slot, and means including separate shafts crossing the respective pad openings and fitting through the respective crimping pin slots, operable to guide each crimping pin relative to its pad.

8. A crimping tool for a corner bead piece, according to claim 7, wherein said intermediate slot in each crimping pin is angled, between 10 and 30 degrees, relative to the length of the crimping pin.

9. A crimping tool for a corner bead piece, according to claim 8, further wherein the crimping pins are angled in the one axial position at between 60 and 90 relative to the tool pad.

10. A crimping tool for a corner bead piece, according to claim 1, further wherein magnet means are carried on the frame and lie coplanar with the pads, operable to engage and magnetically hold the corner bead piece relative to the tool, so as to allow one hand manipulation of the crimping tool and corner bead piece in initially positioning the corner bead piece onto and over the structural corner.

11. A crimping tool for a corner bead piece, according to claim 1, further wherein the frame arms define a rear side opposite from the pads, and presenting two generally flat faces meeting at an exterior corner, the frame also defining and end face disposed transverse to the pads and at the end of the frame opposite from the crimping pins, and a clip having one free end secured to the end face of the frame, and having another free end disposed to lie closely adjacent but spaced from one flat face, the clip being operable to be fitted over and become fixed onto a tool belt, for carrying the tool when not in use.

12. A tool for crimping a corner bead piece to an underlying exterior structural corner, comprising the combination of

- a frame having arms defining two pads angled substantially normal to one another across an interior corner, adapted to be positioned against and over the corner bead piece,
- two separate elongated crimping pins and means including an opening in each pad to receive one of the crimping pins angled transversely relative to the respective tool pad,
- a striker, means to support the striker to recriprocate along a path angled relative to the pads, and means pivotally connecting the remote ends of the crimping pins to the striker,
- means including said crimping pin having an elongated intermediate slot, and separate shafts crossing the respective pad opening and fitting through the respective crimping pin slot, operable to guide each crimping pin for complex axial and rotational movements relative to its pad,
- said pivotal connecting means being spaced apart a distance greater than the distance between the intermediate guide means of the crimping pins, to provide thereby that the crimping pins diverge in the direction away from the pads and are angled substantially symetrically relative to the pads and the movement of the striker,
- each crimping pin having its adjacent end recessed within its pad, in one axial position, and projected outwardly beyond its pad in other axial positions,
- said crimping pin being arranged operable to pass the adjacent end of the crimping pin with clearance initially just outwardly beyond the edge of the underlying corner bead piece, and thereafter to force the crimping pin increasingly against the corner bead piece, in moving from the one recessed axial position to the other projected axial positions,
- spring means disposed between the frame and the striker operable to bias the crimping pins in the direction toward the recessed axial position, and
- said striker being adapted to be hit with a mallet or the like to drive the crimping pins against and into the underlying corner bead piece and into the corner structure, to crimp and secure the corner bead piece to the corner structure.

13. A crimping tool for a corner bead piece, according to claim 12, wherein said intermediate slot in each crimping pin is angled, between 10 and 30 degrees, relative to the length of the crimping pin.

14. A crimping tool for a corner bead piece, according to claim 12, further wherein the crimping pins are angled in the one axial position at between 60 and 90 relative to the tool pad.

15. A crimping tool for a corner bead piece, according to claim 12, further wherein magnet means are carried on the frame and lie coplanar with the pads, operable to engage and magnetically hold the corner bead piece relative to the tool, so as to allow one hand manipulation of the crimping tool and corner bead piece in initially positioning the corner bead piece onto and over the structural corner.

16. A crimping tool for a corner bead piece, according to claim 12, further wherein the frame arms define a rear side opposite from the pads, and presenting two generally flat faces meeting at an exterior corner, the frame also defining and end face disposed transverse to the pads and at the end of the frame opposite from the crimping pins, and a clip having one free end secured to the end face of the frame, and having another free end disposed to lie closely adjacent but spaced from one flat face, the clip being operable to be fitted over and become fixed onto a tool belt, for carrying the tool when not in use.

17. A tool for crimping a corner bead piece to an underlying exterior structure corner, comprising the combination of

- a frame having arms defining two pads angled substantially normal to one another across an interior corner, adapted to be positioned against and over the corner bead piece,
- two separate elongated crimping pins and means including an opening in each pad adjacent one end of the frame to receive one of the crimping pins angled transversely relative to the respective tool pad,
- a striker, means to support the striker to recriprocate along a path angled relative to the pads, and means pivotally connecting the remote ends of the crimping pins to the striker, means including said crimping pin having an elongated intermediate slot, and separate shafts crossing the respective pad openings and fitting through the respective crimping pin slot, operable to guide each crimping pin for complex axial and rotational movements relative to its pad, said pivotal connecting means being spaced apart a distance greater than the distance between the intermediate guide means of the crimping pins, to provide thereby that the crimping pins diverge in the direction away from the pads and are angled substantially symetrically relative to the pads and the movement of the striker, each crimping pin having its adjacent end recessed within its pad, in one axial position, and projected outwardly beyond its pad in other axial positions, said crimping pin slot being arranged relative to the underlying corner bead piece operable to pass the adjacent end of the crimping pin with clearance initially just outwardly beyond the edge of the corner bead piece, and thereafter to force the crimping pin increasingly against the corner bead piece, in moving from the one recessed axial position to the other projected axial positions, said striker being adapted to be hit with a mallet or the like to drive the crimping pins against and into the underlying corner bead piece and into the corner structure, to crimp and secure the corner bead piece to the corner structure, magnet means carried on the frame and disposed coplanar with the pads, operable to engage and magnetically hold the corner bead piece relative to the tool, so as to allow one hand manipulation of the crimping tool and corner bead piece in initially positioning the cornern bead piece onto and over the structural corner, the frame arms defining a rear side opposite from the pads, and presenting two generally flat faces meeting at an exterior corner, the frame also defining an end face disposed transverse to the pads and at the end of the frame opposite from the crimping pins, and a clip having one free end secured to the end face of the frame, and having another free end disposed to lie closely adjacent but spaced from one flat frame arm faces, the clip being operable to be fitted over and become fixed onto a tool belt, for carrying the tool when not in use.

* * * * *